United States Patent [19]

Elsel

[11] 4,228,374
[45] Oct. 14, 1980

[54] ARRANGEMENT FOR COOLING THE ROTOR OF AN ELECTRIC MACHINE, ESPECIALLY A TURBINE TYPE GENERATOR

[75] Inventor: Werner Elsel, Erlangen, Fed. Rep. of Germany

[73] Assignee: Siemens Aktiengesellschaft, Berlin and Munich, Fed. Rep. of Germany

[21] Appl. No.: 944,391

[22] Filed: Sep. 21, 1978

[30] Foreign Application Priority Data

Sep. 21, 1977 [DE] Fed. Rep. of Germany ....... 2742477

[51] Int. Cl.² .............................................. H02K 9/00
[52] U.S. Cl. ........................................ 310/53; 310/64
[58] Field of Search ................... 310/52, 106, 40, 54, 310/58, 64, 261, 53; 336/DIG.1

[56] References Cited

U.S. PATENT DOCUMENTS

| 3,679,920 | 7/1972 | MacNab | 310/10 |
| 3,781,578 | 12/1973 | Smith | 310/52 |
| 4,035,678 | 7/1977 | Lambrect | 310/52 |
| 4,079,273 | 3/1978 | Lambrecht | 310/52 |
| 4,085,343 | 4/1978 | Hasegawa | 310/52 |
| 4,101,793 | 7/1979 | Berthet | 310/52 |

*Primary Examiner*—R. Skudy
*Attorney, Agent, or Firm*—Kenyon & Kenyon

[57] ABSTRACT

The invention relates to an arrangement for cooling the rotor of an electric machine, especially a turbine-type generator. The rotor contains a superconducting field winding, a co-rotating cold shield and a co-rotating mixing chamber for receiving a phase mixture of a coolant. A first coolant stream with a liquid coolant is further provided for cooling the field winding and a second coolant stream for cooling the cold shield. A substream derived from the first coolant stream after the latter has passed through the field winding is admixed to the second coolant stream and that a corresponding connecting line is provided with a throttling device.

9 Claims, 3 Drawing Figures

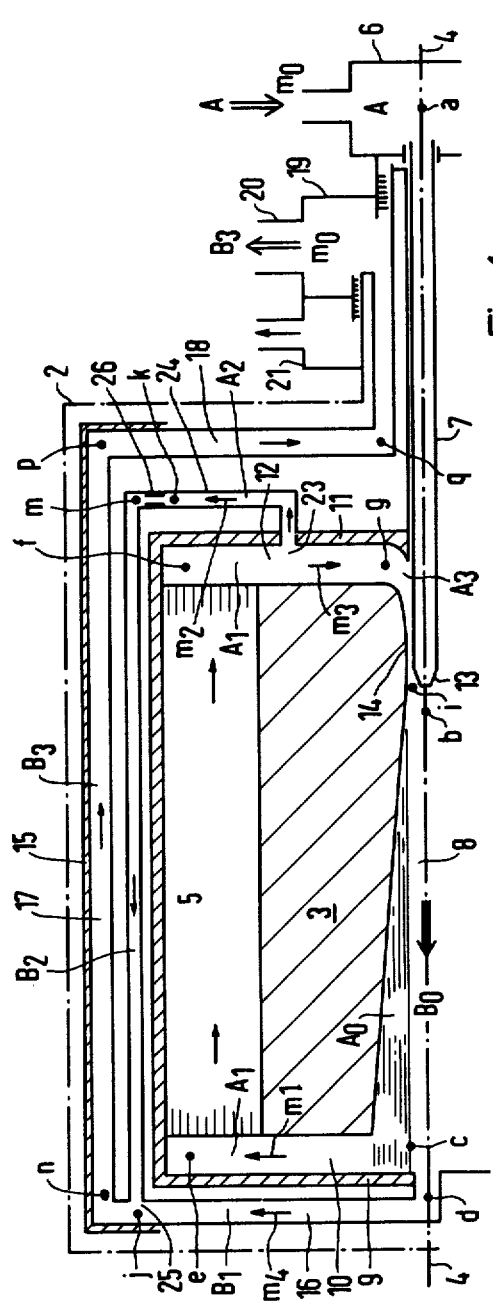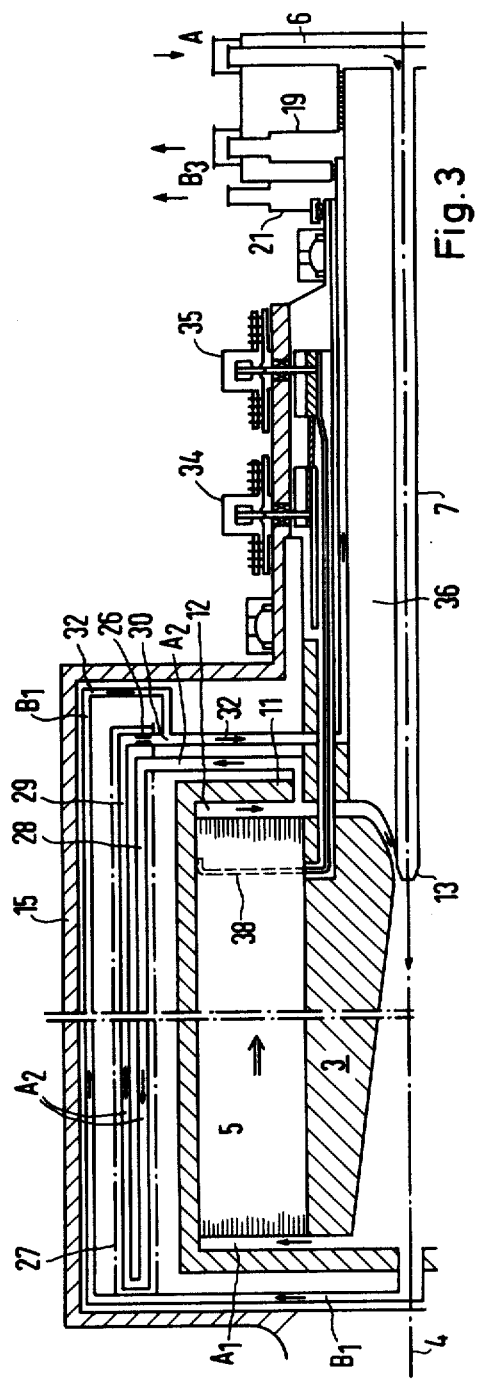

ARRANGEMENT FOR COOLING THE ROTOR OF AN ELECTRIC MACHINE, ESPECIALLY A TURBINE TYPE GENERATOR

BACKGROUND OF THE INVENTION

The invention relates to an arrangement for cooling the rotor of an electric machine, especially a turbine type generator, with a superconducting field winding which is surrounded by a co-rotating cold shield, and with a co-rotating mixing chamber which contains a phase mixture of a coolant fed in from the outside and from which a first coolant stream with a liquid coolant can be taken for cooling the field winding and a second coolant stream with an at least partially evaporated coolant for cooling the cold shield, and wherein the first coolant stream conducted through the field winding is returned to the mixing chamer and the second coolant stream conducted through the cold shield is returned from the machine.

A turbine type generator with a cooling arrangement of this kind is known from the report "EPRI TD-255, Project 672-1, Final Report", August, 1976, pages 45 to 48, with the title "Superconductors in Large Synchronous Machines". The coolant required for the cooling is conducted from a refrigeration machine centrally through the rotor shaft in liquid condition and at low pressure via a rotating coupling and is fed into a mixing chamber provided there near the axis. The corresponding feed point is designed as a Joule-Thomson device, so that a two phase mixture of liquid and gaseous coolant is formed in the mixing chamber. Due to the centrifugal forces acting on this two phase mixture during the rotation, the coolant vapor positions itself in regions near the axis and the coolant liquid in regions away from the axis of the mixing chamber. From the mixing chamber, a first coolant stream with liquid coolant is pumped via radial canals into a coolant bath in which the superconducting field winding is arranged. In the coolant bath, the heat dissipation of the winding is given off to the coolant, which is conducted back into the mixing chamber via radial canals. The heat carried along in this process causes partial evaporation of the coolant. For cooling the cold shield, a second coolant stream with coolant vapor derived from the regions of the mixing chamber close to the axis is provided. The cold shield is in general a co-rotating damper shield between the field winding and a stationary stator winding of the machine surrounding the former. After the second coolant stream has been conducted through cooling canals which are connected to the damper shield in a heat transfer manner, it is conducted out of the rotor via a further rotating helium coupling near the rotor axis and returned to the refrigeration machine. The necessary pumping action for developing the flow of the first and second coolant stream is brought about by the so-called self-pumping effect. There, the coolant is accelerated in radially outward-leading canals due to centrifugal forces and can thus be pumped into the field winding and the cold or damper shield, respectively. Since it is warmed up in these parts due to the heat dissipation occurring or by heat transfer from the outside, its specific gravity is decreased accordingly. Thus, a pressure gradient develops between the entrance and exit points of the coolant, which is sufficient for returning the coolant to regions near the axis.

However, in the known machine, the permissible damper losses are limited by the available quantity of vapor. In the event of disturbances, for instance, in case of sudden load changes, unbalanced load or short circuits, however, the damper loss can increase in step fashion. The amount of coolant of the second coolant stream available for removing this dissipation may then be too small, however, to prevent an excessive temperature rise of the cold or damper shield. At this temperature rise of the cold or damper shield also reacts back on the superconducting field winding, the danger exists that the field winding could heat up excessively.

BRIEF DESCRIPTION OF THE INVENTION

It is therefore an object of the present invention to provide an arrangement for cooling such a machine, in which the danger of the field winding heating up excessively does not exist. In particular, optimum cooling of all parts of the rotor is to be ensured reliably even in the event of disturbances and it should especially be possible to adapt the coolant throughput of the second coolant stream for cooling the cold or damper shield relatively quickly in resonse to the losses occurring in the damper. In addition, it should be possible to keep the refrigeration machine located outside the electric machine, which must be provided for cooling the rotor, relatively small and to avoid increasing the number of rotating coolant lead ins.

To solve this problem in an arrangement for cooling of the type mentioned at the outset, according to the present invention, there is admixed to the second coolant stream a substream derived from the first coolant stream after it has passed through the field winding, and a corresponding connecting line with a throttling device for decompressing the derived substream is provided.

The advantages of this embodiment of the arrangement for cooling a rotor are in particular that, by means of the throttling device in the connecting line between the loop for cooling the field winding and the loop for cooling the cold or damper shield, the amount of coolant additionally fed into the second coolant stream can be adapted, without much time delay, to the losses occurring in the cold or damper shield. Since, furthermore, the cooling arrangement contains the co-rotating mixing chamber known per se, the coolant mass throughput of the required external refrigeration machine can be kept relatively small. In addition, only one rotating coolant feedthrough each is advantageously required for admitting and discharging the coolant to and from the rotor. The design and arrangement of the cooling system is therefore relatively simple, and the coolant losses at the coolant feedthroughs are accordingly small.

According to one advantageous further embodiment of the arrangement for cooling, the end section of the feed line for feeding the coolant supplied from the outside into the mixing chamber can be designed as a nozzle, at the mouth of which an underpressure formation in the manner of a water jet pump is provided for drawing in that part of the first coolant stream which is to be retured to the mixing chamber. This underpressure formation can aid the flow of the first coolant through the superconducting winding due to the self-pumping effect.

The throttling device in the connecting line can furthermore advantageously be arranged at the ends of the latter in the vicinity of the inflow point into the second coolant stream. The relatively long connecting line is then filled with the not yet decompresed cold coolant from the first coolant substream. The dissipation heat occurring in the cold or damper shield can thus be removed by this cold coolant in the connecting line with correspondingly high efficiency. Optionally, the connecting line can therefore also be connected to a further cold shield in a heat-conducting manner.

BRIEF DESCRIPTION OF THE DRAWINGS

FIG. 1 is a diagrammatic cross section through an arrangement for cooling a rotor according to the present invention.

FIG. 3 shows diagrammatically a further possible embodiment of a cooling arrangement according to the present invention.

DETAILED DESCRIPTION OF THE INVENTION

Figure 2:
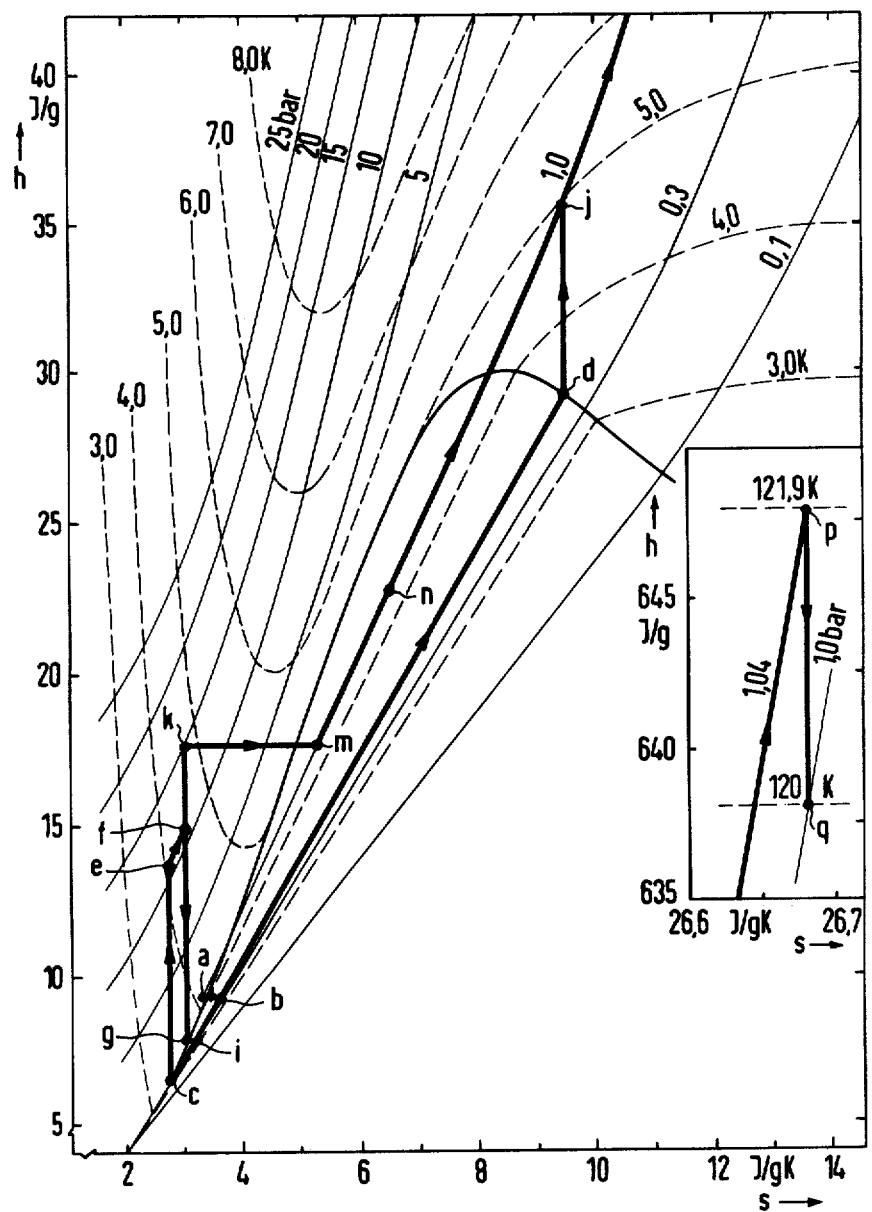
In FIG. 2 is a diagram of the enthalpy of the arrangement of FIG. 1 as a function of the entropy.

From FIG. 1 it will be seen how a coolant is conducted through the rotor of an electric machine, particularly a turbine type generator. In the figure, only the upper half of the respective cooling arrangement is shown in a cross section. The flow directions of the individual coolant streams are indicated by arrows. The rotating parts of the machine which are to be cooled are arranged in a vacuum in order to thereby limit a heat inflow into these parts from the outside. A co-rotating vacuum housing required therefor is indicated by a dashed-dotted line 2. The rotor body 3 of the machine is arranged concentrically about an axis 4 and contains a field winding 5 which is arranged, for instance, in slots on its outside or inside. The conductors of the winding 5 contain superconductive material, so that helium is provided as coolant. The coolant is designated with A, which is in the liquid state and is taken from a refrigeration machine, not shown in the figure and can be fed into the rotor via a helium coupling 6. By means of such a helium coupling, which is known, for instance, from the publication "Siemens Forschungs-und Entwicklungsberichte", vol. 5 (1976), no. 1, page 13, the coolant A is transferred from stationary to rotating machine parts. Via a central feed line 7 centrally arranged in the rotor, the coolant A is then conducted into a mixing chamber 8 arranged within the rotor body 3, in the process of which it is decompressed and thus partially evaporated. In this likewise centrally arranged mixing chamber 8 is therefore contained a phase mixture of liquid coolant $A_o$ and gaseous coolant $B_o$. However, a phase separation takes place under the influence of centrifugal forces during rotation, so that the heavier liquid coolant $A_o$ settles concentrically about the coolant $B_o$ which is held along the rotor axis 4. At that end face 9 of the rotor body 3 which is opposite the feed-in point of coolant A into the mixing chamber 8, at least one radial coolant winding feed line 10 is connected at the outer circumference of the mixing chamber, via which a first coolant stream $A_1$ of liquid coolant is fed to the superconducting field winding 5. Axial winding cooling canals go through the field winding (not detailed here), so that the coolant stream $A_1$ leaves the winding again at the opposite end face 11 of the rotor body 3. A substream $A_3$ of the first coolant stream $A_1$ is then returned to the mixing chamber 8 via at least one radial winding discharge line 12.

In this loop for cooling the superconducting field winding 5, the so-called self-pumping effect is utilized.

Due to the centrifugal forces during rotation, the coolant $A_1$ in the radial coolant winding feed line 10 is first accelerated outward and thus pressed into the winding cooling canals of the super-conducting winding 5. There, it is warmed up by the dissipation heat generated in the winding. The reduction of the specific gravity of the coolant $A_1$ connected therewith causes a reduction of the pressure, by which it can flow back into the mixing chamber 8 via the radial winding discharge line 12. The feeding of the liquid coolant into the coolant winding feed line 10 is further aided by the fact that the mixing chamber 8 is conically expanded toward the end face 9 of the rotor body 3, to which the coolant winding feed line 10 is connected and thus the pressure in the coolant liquid $A_o$ in the mixing chamber is increased accordingly toward the side. In addition, the separation of the phases of the phase mixture in the mixing chamber 8 is facilitated by this measure. The return of the coolant into the mixing chamber 8 can further be aided by the provision that the end section of the central coolant feed line 7, at which the coolant A taken from the external refrigeration machine is introduced into the mixing chamber 8, is formed as an injection nozzle 13, so that the coolant A emerges from this feed line 7 into the mixing chamber 8 with increased flow velocity. In accordance with the design principle of a water jet pump, the underpressure developing laterally to the merging coolant jet can then be used to draw up the coolant streams $A_1$ and $A_3$, respectively, returned in the coolant winding discharge line 12. The end of this coolant winding discharge line 12 is therefore designed as a corresponding suction canal 14 which closely surrounds the mouth of the injection jet 13.

The gaseous coolant $B_o$ arranged in the mixing chamber 8 in the region near the axis is in part utilized for cooling a cold shield 15 which concentrically surrounds the field winding 5. This cold shield, which is detailed only in part in the figure, serves in general also as a damper shield or winding, by which reaction fields which stem from a stator closely surrounding the rotor but not shown in the figure and which penetrate the co-rotating vacuum housing 2, are reduced to an amont permissible for the superconductors of the field winding 5. At the end face 9 of the rotor body 3, a second coolant stream $B_1$ with coolant vapor is therefore taken from the mixing chamber 8 at a point near the axis and is conducted via at least one radial cold shield feed line 16 into cold shield cooling canals 17 which are connected in a heat-conducting manner to the cold or damper shield 15 and extend in the axial direction. At the opposite end of the cold or damper shield 15, which faces the end face 11 of the rotor body 3, the second coolant stream is then derived again in at least one radial coolant cold shield discharge line 18 and conducted in the vicinity of the axis, via a further rotating helium coupling 19, from the rotating machine parts into a stationary gas line 20, which can be connected to the refrigeration machine, not shown in the figure. In the figure, still another rotating helium coupling 21 is indicated, by which the leakage losses of gaseous helium occurring at the rotating coupler parts can be collected and fed into the gas line 20.

The flow in this loop with the second coolant stream for cooling the cold or damper shield comes likewise about by the self-pumping effect.

So that additional losses that occur suddenly in the cold or damper shield, such as are produced, for instance, in the event of a disturbance in case of a short circuit or unbalanced load, can be removed, it is provided in the cooling arrangement according to the invention that gaseous coolant can additionally be fed into the cooling loop for cooling the cold or damper shield. This coolant is taken from the loop for cooling the superconducting winding 5. The corresponding branching point 23 in this loop is advantageously provided in the winding discharge line 12 of the first coolant stream $A_1$. From there, part of this first coolant stream $A_1$ is derived into a corresponding connecting line 24. This substream of liquid coolant is designated with $A_2$. The connecting line 24 leads into the coolant cold shield feed line 16 of the second coolant stream $B_1$ immediately ahead of the entry of the latter into the cold shield cooling canals 17 at the cold or damper shield 15. The inlet point in the cold shield feed line 16 is designated with 25. In the connecting line 24 is further provided a throttling device 26, by which the still liquid coolant stream $A_2$ stemming from the cooling loop for the superconducting winding 5 can be decompressed and thereby evaporated. The coolant vapor of the substream obtained in this manner is designated with $B_2$. The quantity of the substream $B_2$ fed into the second coolant stream $B_1$ can then be adjusted by means of the throttling device 26. The combined coolant streams $B_1$ and $B_2$ are designated in the figure with $B_3$.

To explain the thermodynamic coolant states during the cooling of the superconducting field winding 5 and the cold or damper shield 15, reference is made to the diagram in FIG. 2, in which the entropy s of the cooling arrangement according to the invention in joules/gram. Kelvin is plotted on the abscissa and the enthalpy h in joules/gram on the ordinate. In the diagram is further entered with dashed curves a family of curves, each of which belongs to a constant temperature between 3 and 8 Kelvin. In addition, there is shown in the diagram a further family of curves with solid, thin lines, which belong to predetermined, constant respective pressures between 0.1 and 25 bar. The thermodynamic transitions obtained inside the cooling arrangement according to FIG. 1 are illustrated by bold lines with arrow heads. The reference points for these transitions are marked in FIG. 1 and in the diagram by lower case letters.

A predetermined relatively small quantity $m_o$ of liquid coolant A taken from the refrigeration machine has in the state a at the helium coupling 6, for instance, a temperature of 4.2 K and is at a pressure of 1 bar. The enthalpy h of the coolant A is then, for instance, about 9.3 J/g and itsentropy s about 3.3 J/gK. The coolant A then gets, via Joule-Thomson expansion, by the injection nozzle 13, into the helium bath in the mixing chamber 8. In this process it assumes the state b when leaving the injection nozzle. Under the action of the centrifugal forces occurring during rotation, the vapor and the liquid in the rotating bath in the mixing chamber 8 are then separated, so that the coolant $A_o$ thereupon assumes state c and the gaseous coolant $B_o$ the state d. A quantity $m_1$ of the first substream $A_1$ of the coolant for cooling the superconducting winding 5, derived from the mixing chamber 8, is isentropically densified in the radial flow in the feed line 10 and assumes state e when entering the superconducting winding 5. To this coolant stream $A_1$ is then imparted within the superconducting winding the latter's dissipation heat, so that it is in state f when leaving at the opposite coil head. The quantity $m_1$ of the coolant stream $A_1$, with the geometry of the feed and discharge lines 10 and 12 as well as of the canals in the field winding 5 given, adjusts itself automatically in dependence on the pressure drop and the losses of the field winding. A partial quantity $m_3$ of this first coolant stream is returned to the coolant bath. In the radial flow toward the axis in the discharge line 12, this partial coolant stream $A_3$ then expands isentropically and assumes state g before entering the mixing chamber. Due to the particular shape of the return point of this remaining substream $A_3$ to the mixing chamber 8 according to the design principle of a water jet pump, this substream expands according to a Joule-Thomson expansion process into the rotating bath in the mixing chamber 8, so that the substream $A_3$ is then in the state i.

The coolant stream $B_1$ with a mass $m_4$ of gaseous coolant for cooling the cold or damper shield 15 is compressed isentropically in the feed line 16 in the radial flow toward this shield. At the feeding point 25 of the substream $B_2$ coming from the loop for the superconducting winding 5, it has assumed the state j. This substream $B_2$, which has the mass $m_2$, is isentropically compressed in the discharge line 12 up to the branching point 23 and then, in the connecting line 24 up to the throttling device 26, so that it is in the state k ahead of the choke point. Within the throttling device, it expands in a Joule-Thomson expansion process approximately to the pressure which prevails at the feed point 25 into the loop for the cold or damper shield 15 and thus is in a state m behind the choke point. At this feed point, the coolant stream $B_1$ of gaseous coolant from the mixing chamber 8 and the coolant substream $B_2$ from the loop for the superconducting winding 5 then mix to form the coolant stream $B_3$ with the mass $m_o$. The state of this coolant stream $B_3$ at the entrance into the cooling canals 17 of the cold or damper shield 15 is designated with n. The dissipation of the cold or damper shield is then absorbed by this coolant stream $B_3$, so that then the state p is assumed when it leaves the cold or damper shield again. The pressure drop due to the flow resistance within the cold or damper shield is also taken into account in the diagram. The coolant stream $B_3$ then expands in the discharge line 18 during the radial flow toward the axis and enters from the helium coupling 19 into the transfer line to the refrigeration machine in the state q. The pressure and the temperature of the rotating bath in the mixing chamber can be fixed by the exit state q of the coolant stream $B_3$ with the mass $m_o$.

In FIG. 3, a further embodiment example of a cooling arrangement according to the invention for the rotor of an electric machine is partially shown in a cross section. Parts coinciding the cooling arrangement according to FIG. 1 are provided with the same reference symbols. This cooling arrangement differs from the embodiment according to FIG. 1 in substance only in that the substream $A_2$ branched off from the cooling loop for the superconducting winding from the return line 12 is first utilized for cooling of a second damper shield 27, indicated in the figure by a dashed-dotted line 27, in axial second cold shield cooling canals 28 and 29. Furthermore, the throttling device 26 for decompressing the substream is provided only immediately ahead of an inlet point 30 into the coolant stream $B_1$ cooling the damper shield 15. The inlet point 30 is provided in a return line 32 for the coolant stream $B_1$ after the latter flows through the damper shield 15.

In the figure are also indicated two current transfer devices 34 and 35 on the part of the shaft 36, which is connected to the end face 11 of the rotor body 3 and extends to the outside. Via the brush contacts of these current transfer devices, an exciter current can be fed to the superconducting field winding 5 from an external current supply unit, not shown in the figure. The current transfer devices 34 and 35 are at room temperature, so that the electric connecting lines, not detailed in the figure, between them and the deep-cooled field winding must traverse a corresponding temperature gradient. The coolant required for cooling these connecting lines is taken from the first coolant stream $A_1$, after the latter has passed through the field winding, at the discharge line 12 via an exhaust gas line 38, and returned to the input of the refrigeration machine.

What I claim is:

1. Apparatus for cooling the rotor of an electric machine having a superconducting field winding longitudinally disposed thereon comprising:
    (a) a first cold shield exteriorly disposed on and co-rotating with the rotor;
    (b) a mixing chamber interiorly and concentrically disposed on and co-rotating with said rotor;
    (c) a coolant unit supplying coolant at a low temperature and receiving coolant at a relatively higher temperature;
    (d) means for injecting a phase mixture of said coolant of said coolant unit into said mixing chamber via a coolant injecting line;
    (e) a first coolant line for a first coolant stream of liquid coolant derived from said coolant phase mixture;
    (f) said first coolant line comprising at least one winding feed line radially disposed at one end of said rotor and in communication with said mixing chamber; further a plurality of winding cooling canals interiorly disposed on said rotor and in heat transfer contact with said superconducting field winding, said winding cooling canals being in communication with said winding feed line; and at least one winding discharge line in communication with said winding cooling canals, radially disposed at the other end of said rotor and in communication with said mixing chamber for conducting at least a part of the first coolant stream into said mixing chamber;
    (g) a second coolant line for a second coolant stream having at least partly evaporated coolant derived from said coolant phase mixture;
    (h) said second coolant line comprising at least one cold shield feed line radially disposed at one end of said rotor and in communication with the radially inner part of the mixing chamber, further at least one cold shield cooling canal in communication with said cold shield feed line said shield cooling canal axially disposed in heat transfer contact with said cold shield; and at least one cold shield discharge line radially disposed at the other end of said rotor, said cold shield discharge line in communication with the input of said coolant unit and said cold shield cooling canal;
    (i) a connecting line in communication with said winding discharge line of the first coolant stream and with the cold shield feed or discharge line of the second coolant stream for admixing a coolant substream derived from said first coolant stream after said first coolant stream has passed through said field winding with said second coolant stream; and
    (j) a throttling device incorporated within said connecting line whereby the amount of additional coolant fed of the coolant substream into said second coolant stream can be controlled.

2. An apparatus for cooling as recited in claim 1 wherein said coolant injecting line comprises:
    a central coolant feed line the end of which is formed as an injection nozzle, interiorly positioned on said mixing chamber.

3. An apparatus for cooling as recited in claim 2 wherein the end of said winding discharge line forms a suction canal closely surrounding said injection nozzle whereby the underpressure developing laterally is used to draw up said first coolant stream from said winding discharge line.

4. An apparatus for cooling as recited in claim 1 wherein said mixing chamber is conically shaped, with a smaller cross sectional area at the end of said rotor near said winding discharge line and a larger cross sectional area at the other end of said rotor near said winding feed line.

5. An apparatus for cooling as recited in claim 1 further comprising:
    a second cold shield interposed between said first cold shield and said rotor;
    at least one second cold shield cooling canal interiorly disposed in and in heat transfer contact with said second cold shield, said second cold shield cooling canal being part of said connecting line.

6. An apparatus for cooling as recited in claim 5 wherein said throttling device is interiorly disposed at the end of said second cold shield cooling canal close to the point of communication between said coolant substream and said second coolant stream.

7. An apparatus for cooling as recited in claim 1 further comprising:
    a plurality of current supply leads in electrical contact with said superconducting field winding;
    a second substream derived from said first coolant stream;
    means for conducting said second substream to said current supply leads.

8. An apparatus for cooling as recited in claim 7 wherein said second substream is derived from said field winding discharge line.

9. A method for cooling the rotor of an electric machine comprising the steps of:
    injecting a main coolant stream from a refrigerating means into a mixing chamber within a rotor;
    driving said coolant stream into a first stream and a second stream by centrifugal force;
    conducting said first stream by centrifugal force of the rotor to a plurality of cooling canals in a field winding;
    conducting said second stream through a plurality of cold shield cooling canals and to a refrigerating means;
    dividing said first stream into a first substream and a second substream after said first stream has passed through said field winding canals;
    conducting said first substream to said cold shield cooling canals and to said refrigeration means;
    throttling said first substream to control the flow of coolant;
    suctioning said second substream into said main coolant stream.

* * * * *